Figure 1:
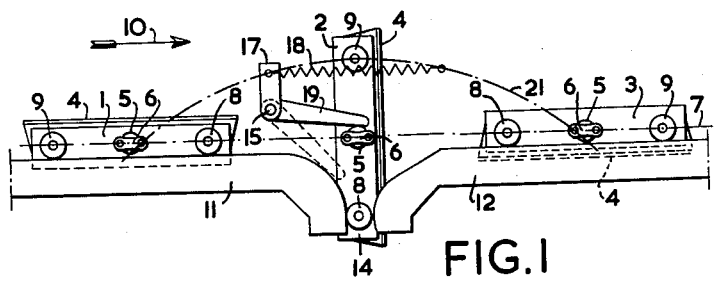

Dec. 11, 1962         I. J. JACOBSEN        3,067,859
TILTING MECHANISM IN MOULD CONVEYORS IN PLANTS
FOR MOULDING CHOCOLATE AND
SIMILAR MASSES
Filed March 14, 1960

INVENTOR

Ib Jorgen Jacobsen

BY *Stevens, Davis, Miller & Mosher*

ATTORNEYS

United States Patent Office 3,067,859
Patented Dec. 11, 1962

3,067,859
TILTING MECHANISM IN MOULD CONVEYORS IN PLANTS FOR MOULDING CHOCOLATE AND SIMILAR MASSES
Ib Jorgen Jacobsen, Soborg, Denmark, assignor to Mikrovaerk A/S, Copenhagen-Soborg, Denmark
Filed Mar. 14, 1960, Ser. No. 14,672
Claims priority, application Denmark Mar. 25, 1959
3 Claims. (Cl. 198—155)

This invention relates to a tilting mechanism in mould conveyors in plants for moulding chocolate and similar masses, in which the conveyor comprises two parallel travelling chains having intermediate mould carriers which are connected with both chains in such a way as to be tiltable about an axis perpendicular to said chains, preferably a central axis in the mould carrier, and in which said mould carriers are at one end or at both ends provided with protruding guiding elements which define the angular position of the mould carriers by engagement with associated stationary guiding rails extending along the chains at the side thereof facing the mould carrier.

In a known mechanism of this type the guiding elements of each mould carrier or mould frame are constituted by a pair of oblong plates secured to either end of the mould carrier in such positions that the tilting axis of the mould carrier passes through the centres of the plates, the longitudinal directions of which includes an angle of 90°. Consequently, the two plates function in combination as a star wheel having four teeth, which can prevent the mould frame from tilting about said axis (by sliding along suitably located guiding rails) and can also cause such tilting to take place (but abutting against stationary cams or rollers in areas where the guiding rails are interrupted). Such tilting or turning of the mould may be effected with a view to discharging the cast bodies from the mould cavities but is also of actual interest in the so-called hollow-article plants where part of the mass cast in each mould cavity shall be discharged prior to solidification so as to leave only a shell of the moulding mass in the mould cavity.

Particularly in the latter case it is of importance that the turning or tilting of the mould is effected as quickly as possible since otherwise the shell will get an uneven thickness in the different portions thereof because the partially solidified mass will "run" during a too slow turning motion.

In practice it has proved that it is impossible in connection with the hereinbefore-mentioned plants to obtain a sufficiently exact guiding of the mould frames during their advance unless resilient guiding rails or similar additional measures are used which complicate the plant, and it is also a substantial drawback of this known plant that the tilting can only be effected at a comparatively slow speed if deteriorating effects of impacts on the guiding elements are to be eliminated.

The tilting mechanism according to the present invention differs from the known plant in that the guiding elements are constituted by pins protruding in the direction of said axis, of which pins at least one is disposed in front of and another behind the axis, as viewed in the direction of travel, the guiding rail or rails in the area where it is desired to effect tilting, having a recess of at least the same width as the guiding pin diameter, and that in connection with said recess members are provided with during the movement of travel can force the front pin, as viewed in the direction of travel, down into said recess but permit the connecting pin between the mould carrier and the chain together with the other guiding pin of passing across and past the recess. By this arrangement a quick and practically impact-free tilting of the mould carriers can be obtained because the front guiding pin is guided down into the recess without abrupt changes of speed. Since the connecting pin between the mould carrier and the chain during this lowering of the guiding pin continues its rectilinear movement, the backmost guiding pin on the mould carrier must necessarily be raised from the guiding path whereby it may be kept quite clear of the members forcing the front guiding pin down into said recess. During the conclusive part of the tilting movement, the guiding pin, which was initially the backmost one, is again lowered down against the guiding rail since the initially foremost guiding pin is now again raised out of the recess by a smooth motion. The circumstance that the tilting or "somersault" is effected without abrupt changes of speed is tantamount to the fact that it can be effected at a quick rate of speed without the risk of damaging the elements comprised by the mechanism.

The members serving for guiding the frontmost guiding pin down into the recess of the guiding rail may by way of example comprise a cam disc driven in time with the travelling motion of the moulds, said cam disc being so arranged as to enter into engagement only with the said frontmost guiding pin but does not influence the carrying pin of the mould carrier. According to the invention it is, however, preferable that said members are constituted by a pawl which is loaded in the direction towards the recess of said guiding path and is carried at the free end of a lever which from the frame of the conveyor extends inwardly across and above the chain in the area below the path through which said other guiding pin travels during the tilting operation. This construction is outstanding inter alia by being extremely simple and reliable because no special device for compulsorily guiding the pawl in relation to the conveyor is required.

Figure 2:
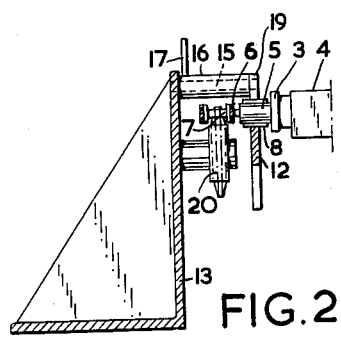

An embodiment of the tilting mechanism according to the invention will now be more fully explained with reference to the accompanying diagrammatical drawing, in which FIG. 1 is a side-elevation of part of a conveyor comprising a tilting mechanism according to the invention, and FIG. 2 is a cross-sectional view of the same conveyor viewed in the direction from the right to the left in FIG. 1.

The conveyor portion shown in FIG. 1 comprises three successively arranged mould carriers 1, 2 and 3, each containing an associated mould plate 4. In the centre of each end-piece, each mould carrier has a hub 5 comprising a pivot pin, not shown, which is journalled in a cover strap 6. By means of a couple of pins or rivets this cover strap 6 is secured to the associated conveyor chain 7 which in FIG. 1 is indicated by a dot-and-dash line. Further, the end-pieces of the mould carriers are provided with two guiding pins or guiding rollers 8 and 9 disposed on either side of the hub 5.

In the normal or upright position of the mould carrier, see left-hand side of FIG. 1, the guiding pin 8 is disposed foremost viewed in the direction of travel of the mould, which in FIG. 1 is indicated by an arrow 10.

During the advance movement the pins 8 and 9 slide along the upper surface of guiding rails 11 and 12 which in a manner not shown are carried by the frame 13, FIG. 2, of the conveyor, and are disposed between the chain 7 and the mould carriers 1, 2 and 3. At the point where the mould carriers are to be tilted, there is a recess in the guiding rail system 11, 12, the two guiding rail parts in the embodiment shown being completely separated from each other and forming a guiding gap 14. The recess has smooth transitions from the upper edges of the guiding rails 11 and 12 so that in side elevation the recess has approximately the shape of a trumpet.

A little to the left of the recess, the frame 13 carries a pin 15 protruding above the chain 7, on which pin 15 there is a bush 16 which in the vicinity of the frame 13 has a radial lever 17 actuated by a tension spring 18 tending to turn the lever 17 in the clockwise direction. At its free end the bush 16 is provided with a pawl 19 which under the influence of the spring 18 is always urged towards the position indicated in dotted lines in FIG. 1.

In FIG. 2, 20 indicates a sprocket wheel over which the chain 7 runs.

In FIG. 1 it is clearly apparent that during the travel of the conveyor the foremost guiding pin 8 of the mould carrier 1 will hit against the pawl 19 when this pawl is in the dotted position and, accordingly, the pawl will guide the pin 8 down into the recess between the two guide rail parts 11 and 12. As the hub 5 of the mould carrier tends to follow the rectilinear path defined by the chain 7, the backmost guiding pin 9 will at the same time be raised from the said path to follow the dot-and-dash line 21.

When during the continuous movement the hub 5 engages the pawl 19, it will raise said pawl into the position shown in full line in FIG. 1, against the tension of the spring 18. Since the lever 17 is laterally displaced as compared with the pawl 19, said arm will not obstruct the movement of the backmost guiding pin 9.

In FIG. 1 the mould carrier 2 is shown halfway through its tilting, i.e. after a 90° turn. It will be seen that after a short further movement in the direction of the arrow 10, the hub 5 of this mould carrier will release the pawl 19 so that this pawl is ready to guide the foremost pin of the subsequent mould carrier 1 down into the recess of the guiding rail.

Instead of a spring-loaded pawl 19 there may, as already mentioned, be used other members for guiding the guiding pin 8 down into the recess. By way of example, a cam disc timed with the travel of the conveyor may be disposed above said recess or provision may be made in front of said recess, as viewed in the direction of travel, and below the guiding rail 11 of a cam disc having a guiding groove facing the mould carriers, said groove being so arranged as to catch the frontmost guiding pin and permit the hub 5 of passing. A further possibility may be mentioned, namely that above the recess a curve rail may be provided which is movable in the transverse direction between an operative position, in which it forces the guiding pin 8 down into the recess, and an inoperative position, in which it permits the hub 5 of passing across the recess. Said recess need not as shown in the drawing be open at its bottom but may by way of example be a cast curve piece interposed between two rectilinear guiding rail parts 11 and 12.

The tilting mechanism as described may easily be made inoperative, if desired, e.g. by placing a filler piece in the recess or simply by the pawl 19 being turned 180° and secured in this position in which it points towards the direction of travel. In such case the lower edge of the pawl will force the backmost guiding pin or guiding roller 9 to follow the rectilinear path as defined by the chain, and the frontmost guiding pin or guiding roller will thereby be prevented from entering the recess.

I claim:

1. A mould conveyor for confectionary mass moulding plants, said conveyor being composed of a first straight conveyor section in which the moulds are movable with one face turning upwardly, a tilting section in which said moulds are inverted, and a second straight conveyor section through which said moulds are movable in inverted position, said conveyor comprising two transversely spaced parallel driving chains extending continuously through said sections, a plurality of mould carriers arranged in the space between the chains, pivot pins connecting the mould carriers to the chains and defining a tilting axis of the mould carriers, a stationary guiding rail extending along at least one of said chains in said conveyor sections, axially protruding guiding elements disposed on said mould carriers at opposite sides of said tilting axis and in a common level therewith so as to cooperate with said guiding rail for defining the angular position of said mould carriers, and a tilting mechanism comprising a recess in said guiding rail at said tilting section and associated means operative to positively force the forward guiding element of each mould carrier into said recess during the traveling motion of said mould carriers and permitting the pivot pins and the rear guiding element to pass across said recess without entering therein.

2. A structure as claimed in claim 1, wherein said means comprises a pawl and means for yieldably urging said pawl against an operative position in which it guides said forward guiding element into said recess, the pawl urging means being such as to permit said pawl to leave said operative position when engaged by said pivot pins.

3. A structure as claimed in claim 1, wherein said means comprises a pawl journalled on a stationary pin disposed at a point above and forward of said recess, a spring urging said pawl against an operative position in which its free end enters said recess, and means for releasably holding said pawl in an inoperative position in which it points against the direction of travel of said mould carriers.

References Cited in the file of this patent

UNITED STATES PATENTS

| | | |
|---|---|---|
| 486,789 | McCaslin | Nov. 22, 1892 |
| 1,328,099 | Parkes | Jan. 13, 1920 |
| 1,428,721 | Towne | Sept. 12, 1922 |
| 1,671,017 | Draeger | May 22, 1928 |
| 1,768,534 | Aiken | July 1, 1930 |

FOREIGN PATENTS

| | | |
|---|---|---|
| 456,559 | Germany | Feb. 27, 1928 |